(12) United States Patent
Totani

(10) Patent No.: US 8,684,557 B2
(45) Date of Patent: Apr. 1, 2014

(54) LED LAMP

(75) Inventor: Tsutomu Totani, Aichi (JP)

(73) Assignee: Beat-Sonic Co., Ltd., Aichi (JP)

( * ) Notice: Subject to any disclaimer, the term of this patent is extended or adjusted under 35 U.S.C. 154(b) by 0 days.

(21) Appl. No.: 13/546,177

(22) Filed: Jul. 11, 2012

(65) Prior Publication Data

US 2013/0033871 A1    Feb. 7, 2013

(30) Foreign Application Priority Data

Aug. 1, 2011  (JP) ............................ P2011-167933
Aug. 18, 2011 (JP) ............................ P2011-178711

(51) Int. Cl.
*F21V 21/00*    (2006.01)

(52) U.S. Cl.
USPC ....... 362/249.02; 362/175; 362/277; 362/373

(58) Field of Classification Search
USPC ............... 362/202, 249.01, 249.02, 268, 308, 362/363, 640, 641, 644, 646, 175, 277, 294, 362/373; 353/70, 71, 79; 40/473, 502
See application file for complete search history.

(56) References Cited

U.S. PATENT DOCUMENTS

| | | | | | |
|---|---|---|---|---|---|
| 3,539,798 | A | * | 11/1970 | Perry | 362/308 |
| 3,622,776 | A | * | 11/1971 | Wyrick | 362/202 |
| 3,780,260 | A | * | 12/1973 | Elsner | 392/392 |
| 5,144,540 | A | * | 9/1992 | Hayes | 362/268 |
| 5,233,375 | A | * | 8/1993 | Williams et al. | 353/43 |
| 5,321,449 | A | * | 6/1994 | Coccoli et al. | 353/43 |
| 5,517,264 | A | * | 5/1996 | Sutton | 353/119 |
| 5,934,223 | A | * | 8/1999 | Ellery-Guy | 119/702 |
| 6,170,958 | B1 | * | 1/2001 | Chien | 362/84 |
| 7,478,912 | B2 | * | 1/2009 | Black, Jr. | 353/70 |
| 8,128,274 | B2 | * | 3/2012 | Chien | 362/641 |
| 8,303,150 | B2 | * | 11/2012 | Chien | 362/555 |
| 2007/0103914 | A1 | * | 5/2007 | McCaffrey | 362/363 |

FOREIGN PATENT DOCUMENTS

| | | |
|---|---|---|
| JP | 02-192601 A | 7/1990 |
| JP | 2005-222750 A | 8/2005 |
| JP | 2008-251512 A | 10/2008 |
| JP | 2011-070972 A | 4/2011 |
| JP | A-2011-70972 | 4/2011 |
| JP | A-2011-82132 | 4/2011 |
| JP | A-2011-90828 | 5/2011 |
| JP | A-2011-91033 | 5/2011 |

OTHER PUBLICATIONS

Office Action mailed Jul. 11, 2013 in the corresponding JP application No. 2011-178711 (English translation).

* cited by examiner

*Primary Examiner* — Hargobind S Sawhney
(74) *Attorney, Agent, or Firm* — Posz Law Group, PLC

(57) ABSTRACT

An LED lamp includes a heat dissipator, a socket mounted on one end of the dissipator, a glove formed of a light-transmissive glass or plastic material and attached to the other end of the dissipator, a module substrate on which an LED chip is mounted, the substrate being mounted on the dissipator, the LED chip being covered with the glove, a lighting circuit supplying electric power to the LED chip and mounted in the dissipater, the lighting circuit being connected to the socket, a light-transmissive sheet having a surface formed with a character, a symbol or a pattern, the light-transmissive sheet being fixed in the dissipater or in the glove so as to be located right in front of the LED chip, and a lens located on a top of the glove so that an enlarged image of the character, the symbol or the pattern is projected through the lens.

7 Claims, 2 Drawing Sheets

LED LAMP

CROSS-REFERENCE TO RELATED APPLICATIONS

This application is based upon and claims the benefit of priority from the prior Japanese Patent Application Nos. 2011-167933 filed on Aug. 1, 2011 and 2011-178711 filed on Aug. 18, 2011, the entire contents of both of which are incorporated herein by reference.

BACKGROUND

1. Technical Field

The present disclosure relates to an LED lamp incorporating an LED chip serving as a light source.

2. Related Art

Demand for LED lamps or LED light bulbs has recently been increasing as substitute for incandescent lamps having higher electrical power consumption. The LED lamps have far less power consumption. One type of LED lamp includes a metal heat dissipator made of a metal, such as aluminum, having high heat conductivity, a socket mounted on one end of the heat dissipator, a glove comprising a light-transmissive glass or plastic material having a semi-spherical top and attached to the other end of the heat dissipator, a module substrate on which an LED chip is mounted and a lighting circuit supplying electrical power to the LED chip. The module substrate and the lighting circuit are mounted on the heat dissipator, and the LED chip is covered by the glove. The lighting circuit and the socket are electrically connected to each other. This type of LED lamp is disclosed by Japanese Patent Application Publication Nos. JP-A-2011-70972, JP-A-2011-82132, JP-A-2011-90828 and JP-A-2011-91033.

Light emitted by a filament serving as a light source for an incandescent lamp is diffused around thereby to evenly illuminate the surrounding area. On the other hand, light emitted by the LED chip used as a light source for an LED lamp has a high directionality and accordingly has a characteristic of illuminating a frontward narrow region by intense light.

Furthermore, the temperature of the filament of the incandescent lamp sometimes rises up to 2,000° C. during turn-on. As a result, the surface of the glove covering the filament is heated thereby to have a high temperature such that touch or contact to the glove surface would result in burn injury.

On the other hand, the LED chip serving as the light source for the LED lamp has an exceedingly lower calorific value during turn-on as compared with the filament. Accordingly, even the temperature of the heat dissipator rises to about several dozen degrees at the highest during turn-on. The glove has such a characteristic that the temperature thereof is so low that the glove can be touched during turn-on as compared with the incandescent lamp.

SUMMARY

An object of the disclosure is to provide an LED lamp which can provide new use applications by making use of high directivity and low heat dissipation of the LED chip serving as the light source thereof.

The present disclosure provides an LED lamp comprising a heat dissipator having two ends, a socket mounted on one end of the heat dissipator, a glove formed of a light-transmissive glass or plastic material and attached to the other end of the heat dissipator, a module substrate on which an LED chip is mounted, the module substrate being mounted on the heat dissipator, the LED chip being covered with the glove, a lighting circuit supplying electric power to the LED chip and mounted in the heat dissipator, the lighting circuit being electrically connected to the socket, a light-transmissive sheet having a surface formed with a character, a symbol or a pattern, the light-transmissive sheet being fixed in the heat dissipator or in the glove so as to be located right in front of the LED chip, and a lens provided on a top of the glove so that an enlarged image of the character, the symbol or the pattern is projected therethrough.

The enlarged image of the character, the symbol or the pattern on the light-transmissive sheet is projected in the above-described construction. Accordingly, the LED lamp can be used as a projection unit which is small-sized, lightweight and low-cost and has a simple structure, with the result that the usage of the LED lamp can be expanded.

A high directivity and low heat dissipation of the LED chip were focused on for the purpose of achieving the above-described construction. More specifically, since the high directional light generated by the LED chip is projected and the lens is formed on the top of the glove, an enlarged image of the character, the symbol or the pattern on the light-transmissive sheet can be projected through the lens.

Since the LED lamp has low heat dissipation, there is no possibility that the light-transmissive sheet would be burned or deformed by heat of the LED chip even when the light-transmissive sheet is disposed right in front of the LED chip.

In one preferred form, the light-transmissive sheet is a liquid crystal panel. When the liquid crystal panel is used as the light-transmissive sheet, the LED lamp may be used as a display which projects an enlarged stationary or moving image.

In another preferred form, the glove is a molded plastic product which has a cylindrical construction and which has two ends one of which is open and the other of which is formed with a top surface; the molded plastic product is attached to the heat dissipator so that the molded plastic product is capable of advancing and receding relative to the other end of the heat dissipator; and the lens is formed integrally with the top surface of the molded plastic product.

The molded plastic product used as the glove has the cylindrical construction and is formed with the top surface with which the lens is formed integrally. Accordingly, the LED lamp usable as a projection unit can be manufactured at low cost. Furthermore, since the glove is attached to the heat dissipator so as to be capable of advancing and receding relative to the heat dissipator, a focused focal point of the lens formed integrally with the glove can be adjusted. Consequently, the symbol or pattern provided on the light-transmissive sheet can be projected onto a screen or a wall surface located away from the LED lamp in a clear form.

In further another form, the light-transmissive sheet is detachable. Consequently, when the glove is detached from the heat dissipater, the light-transmissive sheet can be replaced by a new one, whereby the symbol or pattern to be projected can be changed to another.

DETAILED DESCRIPTION

Figure 1:
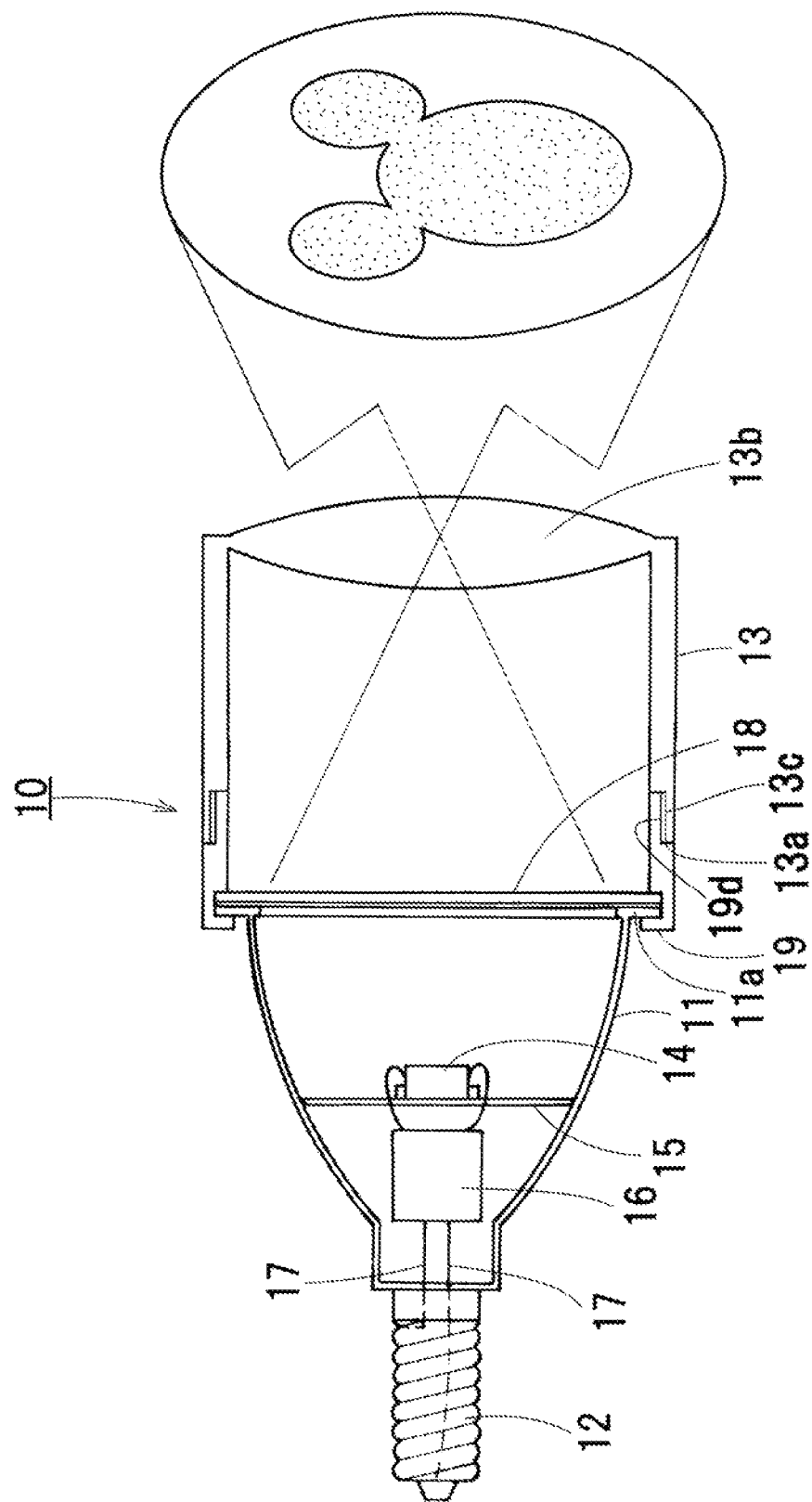
FIG. 1 is a sectional view of an LED lamp according to an embodiment.
Figure 2:
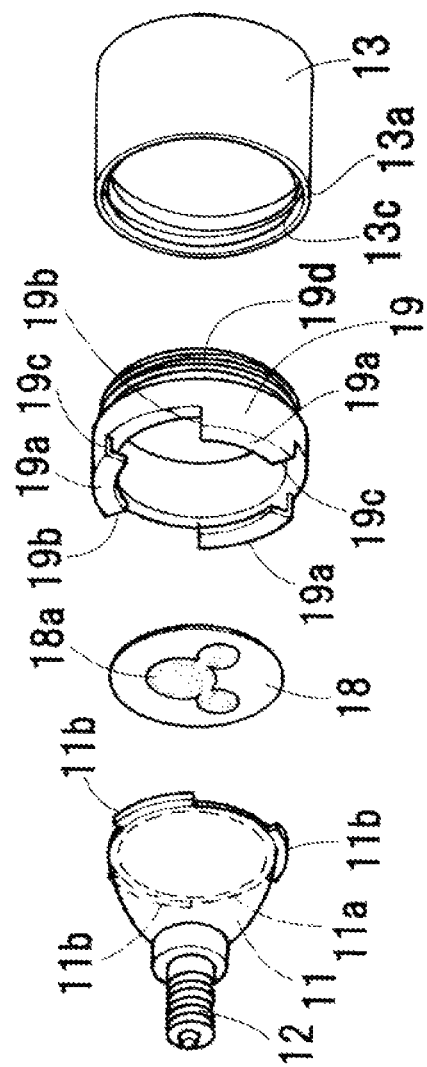
FIG. 2 is an exploded perspective view of the LED lamp.

An embodiment will be described with reference to the accompanying drawings. Referring to FIGS. 1 and 2, an LED lamp 10 according to the embodiment is shown. The LED lamp 10 includes a heat dissipater 11 made of a metal, such as aluminum, or a ceramic material both having a high heat conductivity and a high heat dissipation performance, a socket 12 mounted on one of two ends of the heat dissipator 11 and having a shape and dimensions according to the International Standard, and a transparent glove 13 made of an acrylic resin and mounted on the other open end of the heat dissipator 11.

The heat dissipater 11 is formed into the shape of a generally inverted truncated cone. A module substrate 15 on which an LED chip 14 is fixed in an interior of the heat dissipater 11. A lighting circuit board 16 supplying electric power to the LED chip 14 is also fixed in the interior of the heat dissipator 11. The LED chip 14 is covered with the glove 13. The socket 12 is electrically connected by a lead wire 17 to the lighting circuit 16. A light-transmissive sheet 13 is fixed to a boundary surface between the heat dissipator 11 and the glove 13.

The glove 13 is an acrylic resin-molded product has two ends. The glove 13 has an opening 13a formed in one end thereof and a top surface 13b formed integrally on the other end thereof, so that the glove 13 is formed into a cylindrical structure. The top surface 13b is formed into the shape of a convex lens. The glove 13 is detachably attached via a ring 19 to the heat dissipator 11. The open end 13a of the glove 13 has an inner periphery formed with a thread 13c. The ring 19 has an outer periphery formed with a thread 19d which has two ends 19b and 19c and is engageable with the threaded part 13c. The ring 19 has three lock grooves 19a each of which is formed so that a width thereof is gradually reduced from one end 19b to the other end 19c.

The other end of the heat dissipator 11 has a flange 11a formed with three lock claws 11b. When the lock claws 11b are inserted into the respective wider ends 19b of the lock grooves 19a and the ring 19 is turned clockwise, the lock claws 11b are pressed into the respective narrower lock grooves 19a, whereby the ring 19 is fixed to the heat dissipator 11. When the ring 19 is turned counterclockwise, the lock claws 11b are disengaged from the respective lock grooves 19a, whereby the ring 19 can be detached from the heat dissipator 11. The thread 13c of the glove 13 is engaged with or screwed into the thread 19d of the ring 19 fixed to the heat dissipator 11, whereby the glove 13 is movable into and out of the heat dissipator 11 and detachably attachable to the heat dissipator 11.

The light-transmissive sheet 18 is interposed between the ring 19 and the flange 11a of the heat dissipator 11. When the ring 19 is locked to the heat dissipator 11, the light-transmissive sheet 18 is held between the ring 19 and the flange 11a so as to be located right in front of the LED chip 14. The light-transmissive sheet 18 can be taken out of the LED lamp 10 when the ring 19 is detached from the heat dissipator 11. The light-transmissive sheet 18 comprises a light-transmissive plastic film and has a surface printed with a pattern 18a.

The LED lamp 10 having the above-described configuration will work as follows. When the LED chip 14 is energized to thereby be lit, an enlarged image of the pattern 18a of the light-transmissive sheet 18 is projected through the lens 13b on the top of the glove 13. In this case, the LED chip 14 has a low calorific value. Accordingly, even when the light-transmissive sheet 18 is disposed right in front of the LED chip 14, there is no possibility that heat generated by the LED chip 14 would cause the light-transmissive sheet 18 to burn or deform.

According to the foregoing embodiment, the LED lamp 10 can be used as a projection unit which is small-sized, light-weight and low-cost and has a simple structure, with the result that the usage of the LED lamp can be expanded.

The molded plastic product is used as the glove 13 has the cylindrical structure and is formed with the top surface with which the lens 13b is formed integrally. Consequently, the LED lamp 10 usable as the projection unit can be manufactured at low cost. Furthermore, the glove 13 is configured to advance and recede relative to the ring 19 fixed to the heat dissipator 11, whereby a focused focal point of the lens 13b formed integrally with the glove 13 can be adjusted, with the result that the pattern formed on the light-transmissive sheet 18 can be projected onto a screen or a wall surface in a clear form.

Furthermore, when the glove 13 is detached from the heat dissipator 11, the light-transmissive sheet 18 can be changed from one to another, whereby the pattern 18a to be projected is changeable to another.

The light-transmissive plastic film printed with the pattern is used as the light-transmissive sheet 18 in the foregoing embodiment. However, when the plastic film is replaced by another one printed with a character or a symbol other than the pattern, the LED lamp 10 can be used as a marker or sign lamp. Additionally, when a liquid-crystal panel is used instead of the plastic film and the LED lamp 10 is connected to a drive control unit of the liquid-crystal panel, the LED lamp 10 can serve as a display which projects an enlarged still image of a photograph taken by a digital camera or a moving image.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. An LED lamp comprising:
   a heat dissipator having two ends;
   a socket mounted on one end of the heat dissipator;
   a glove formed of a light-transmissive glass or plastic material and attached to the other end of the heat dissipator;
   a module substrate on which an LED chip is mounted, the module substrate being mounted on the heat dissipator, the LED chip being covered with the glove;
   a lighting circuit supplying electric power to the LED chip and mounted in the heat dissipator, the lighting circuit being electrically connected to the socket;
   a light-transmissive sheet having a surface formed with a character, a symbol or a pattern, the light-transmissive sheet being fixed in the heat dissipator or in the glove so as to be located right in front of the LED chip; and
   a lens provided on a top of the glove so that an enlarged image of the character, the symbol or the pattern is projected therethrough, wherein
   the glove is movably attached to the heat dissipator and is configured to advance and recede relative to the other end of the heat dissipater.

2. The LED lamp according to claim 1, wherein the light-transmissive sheet is a liquid crystal panel.

3. The LED lamp according to claim 1, wherein
   the glove is a molded plastic product which has a cylindrical construction and which has two ends one of which is open and the other of which is formed with a top surface;
   the lens is formed integrally with the top surface of the molded plastic product.

4. The LED lamp according to claim 3, wherein the light-transmissive sheet is detachable from the heat dissipator.

5. The LED lamp according to claim 1, wherein
the glove is attached with a male-female thread structure with respect to the heat dissipater,
wherein, when the glove advances or recedes by rotating on the male-female thread structure, a focal point of the lens is adjusted.

6. The LED lamp according to claim 5, wherein
the other end of the heat dissipater has a flange formed with at least one lock claw, and
the male-female thread structure further includes at least one lock groove which is engaged with the at least one lock claw, and detachably engages the glove to the heat dissipater.

7. The LED lamp according to claim 1, wherein
the glove has an inner periphery that includes a threaded part which is integral therein,
the other end of the heat dissipater has a flange having at least one lock claw,
further comprising a ring which has an outer periphery having a thread which is rotatably engaged with the threaded part of the glove, and at least one lock groove which is detachably engaged with the at least one lock claw, wherein
the glove further is rotatably and detachably attached to the heat dissipater through the ring,
the lens on the glove is arranged to advance and recede relative to the other end of the heat dissipater when the glove is rotated on the threaded part engaged with the thread.

* * * * *